(12) United States Patent
Chillar et al.

(10) Patent No.: US 7,870,718 B2
(45) Date of Patent: *Jan. 18, 2011

(54) PURGE SYSTEM FOR AN EXHAUST GAS RECIRCULATION SYSTEM

(75) Inventors: Rahul J. Chillar, Greenville, SC (US); Robert W. Taylor, Ponte Vedra Beach, FL (US); James E. Roberts, Kansas City, MO (US); Joell R. Hibshman, II, Greer, SC (US); Peter Martin Maly, Lake Forest, CA (US); Dale J. Davis, Marietta, GA (US)

(73) Assignee: General Electric Company, Schenectady, NY (US)

( * ) Notice: Subject to any disclaimer, the term of this patent is extended or adjusted under 35 U.S.C. 154(b) by 471 days.

This patent is subject to a terminal disclaimer.

(21) Appl. No.: 11/939,709

(22) Filed: Nov. 14, 2007

(65) Prior Publication Data

US 2009/0120089 A1    May 14, 2009

(51) Int. Cl.
*F02G 1/00* (2006.01)
*F02G 3/00* (2006.01)
*F02M 25/07* (2006.01)
*F02M 25/06* (2006.01)

(52) U.S. Cl. .......... 60/39.52; 60/39.45; 60/39.12; 60/605.2; 60/278; 123/568.12; 123/568.15

(58) Field of Classification Search .......... 60/605.2, 60/278–279, 310, 311, 678, 39.52, 39.45, 60/39.12, 772, 784, 781, 755, 649; 123/568.12, 123/568.15

See application file for complete search history.

(56) References Cited

U.S. PATENT DOCUMENTS

| | | | | | |
|---|---|---|---|---|---|
| 4,121,912 | A | * | 10/1978 | Barber et al. | 60/39.12 |
| 4,215,550 | A | * | 8/1980 | Dinger et al. | 60/605.2 |
| 4,799,461 | A | * | 1/1989 | Shigenaka et al. | 122/7 R |
| 4,942,921 | A | * | 7/1990 | Haessig et al. | 165/214 |
| 5,096,470 | A | * | 3/1992 | Krishnamurthy | 95/102 |
| 5,426,936 | A | * | 6/1995 | Levendis et al. | 60/311 |
| 5,457,958 | A | * | 10/1995 | Boegner et al. | 60/279 |
| 5,592,925 | A | * | 1/1997 | Machida et al. | 60/311 |
| 5,669,365 | A | * | 9/1997 | Gartner et al. | 123/568.12 |
| 5,894,719 | A | * | 4/1999 | Nalim et al. | 60/39.45 |
| 5,974,802 | A | * | 11/1999 | Blake | 60/605.2 |
| 6,295,815 | B1 | * | 10/2001 | Bechle et al. | 60/605.2 |
| 6,484,703 | B1 | * | 11/2002 | Bailey | 123/568.15 |

(Continued)

FOREIGN PATENT DOCUMENTS

DE    102004021386 A1 * 11/2005

(Continued)

*Primary Examiner*—Thai Ba Trieu
(74) *Attorney, Agent, or Firm*—Dale J. Davis; Ernest G. Cusick; Frank A. Landgraff

(57) ABSTRACT

The exhaust within an exhaust gas recirculation (EGR) system should be purged to allow for access to the components of the EGR system. A system and method for purging the EGR system is provided. The system and method may incorporate an: EGR purge fan, an EGR purge blower, or a turbomachine. The system and method may draw the exhaust out of the EGR system. The system and method may drive the exhaust out of the EGR system.

16 Claims, 3 Drawing Sheets

U.S. PATENT DOCUMENTS

| | | | |
|---|---|---|---|
| 6,526,753 B1 * | 3/2003 | Bailey | 60/605.2 |
| 6,964,158 B2 * | 11/2005 | Abdul-Khalek | 60/278 |
| 7,281,529 B2 * | 10/2007 | Lew et al. | 123/568.12 |
| 7,343,908 B2 * | 3/2008 | Lohmann | 123/568.15 |
| 7,349,792 B2 * | 3/2008 | Durand | 123/568.12 |
| 7,536,252 B1 * | 5/2009 | Hibshman et al. | 60/605.2 |
| 2005/0132713 A1 * | 6/2005 | Neary | 60/784 |
| 2010/0107592 A1 * | 5/2010 | Botero et al. | 60/39.52 |

FOREIGN PATENT DOCUMENTS

| | | | |
|---|---|---|---|
| JP | 57073827 A | * | 5/1982 |
| JP | 2002332919 A | * | 11/2002 |
| KR | 2002030354 A | * | 4/2002 |

* cited by examiner

PURGE SYSTEM FOR AN EXHAUST GAS RECIRCULATION SYSTEM

This application is related to commonly-assigned U.S. patent application Ser. No. 11/928,038, filed Oct. 30, 2007; and U.S. patent application Ser. No. 11/936,996, filed Nov. 8, 2007.

BACKGROUND OF THE INVENTION

The present invention relates to an exhaust gas recirculation (EGR) system for a turbomachine, and more particularly to a system for purging the exhaust gas from the EGR.

There is a growing concern over the long-term of Nitrogen Oxides (hereinafter NOx), Carbon Dioxide (hereinafter "$CO_2$") and Sulfur Oxides (SOx) emissions on the environment. The allowable levels of those emissions that may be emitted by a turbomachine, such as a gas turbine, are heavily regulated. Operators of turbomachines desire methods of reducing the levels of NOx, $CO_2$, and SOx emitted.

Significant amounts of condensable vapors exist in the exhaust gas stream. These vapors usually contain a variety of constituents such as water, acids, aldehydes, hydrocarbons, sulfur oxides, and chlorine compounds. Left untreated, these constituents will accelerate corrosion and fouling of the internal components if allowed to enter the gas turbine.

Exhaust gas recirculation (EGR) generally involves recirculating a portion of the exhaust through an inlet portion of the turbomachine where it is mixed with the incoming airflow prior to combustion. This process facilitates the removal and sequestration of concentrated $CO_2$, and also reduces NOx emissions.

Access to the EGR system components may be necessary for maintenance, inspection, repair, or other purposes. The exhaust should be purged from the EGR system: prior to access; when the EGR system is not in use; or when the turbomachine is not generating exhaust. Furthermore, remnants of the exhaust that are not purged may condense within the EGR system leading to the corrosion of the components.

For the foregoing reasons, there is a need for a system and method for purging an EGR system. After use, the system should allow for access to the components of EGR system, and reduce the possibility of corrosion of the components.

BRIEF DESCRIPTION OF THE INVENTION

In accordance with an embodiment of the present invention, a system for purging an exhaust stream from at least one exhaust gas recirculation (EGR) system, wherein the exhaust stream exits a turbomachine; the system comprising: at least one EGR system comprising: a first zone, a second zone; an EGR skid, an EGR inlet damper, and an EGR outlet damper; wherein the at least one EGR system reduces the level of constituents within the exhaust stream; an EGR purge system comprising: at least one first purge flow modulation device located within the first zone, and at least one second purge flow modulation device located within the second zone; wherein locations of the at least one first purge flow modulation device and the at least one second purge flow modulation device allows for a pressure balance within the EGR system; wherein the EGR purge system can establish a pressure drop between the EGR first zone and EGR second zone; and wherein the EGR purge system purges the exhaust stream from the at least one EGR system.

In accordance with an alternate embodiment of the present invention, a method of purging an exhaust stream from at least one exhaust gas recirculation (EGR) system, wherein the exhaust stream exits a turbomachine; the method comprising: providing at least one EGR system comprising: a first zone, a second zone; an EGR skid, an EGR inlet damper, and an EGR outlet damper; wherein the at least one EGR system reduces the level of constituents within the exhaust stream; providing an EGR purge system comprising: at least one first purge flow modulation device located within the first zone, and at least one second purge flow modulation device located within the second zone; establishing a pressure balance within the EGR system between the at least one first purge flow modulation device and the at least one second purge flow modulation device; establishing a pressure drop between the first zone and second zone; and utilizing the EGR purge system to purge the exhaust stream from the at least one EGR system.

DETAILED DESCRIPTION OF THE INVENTION

Figure 1:
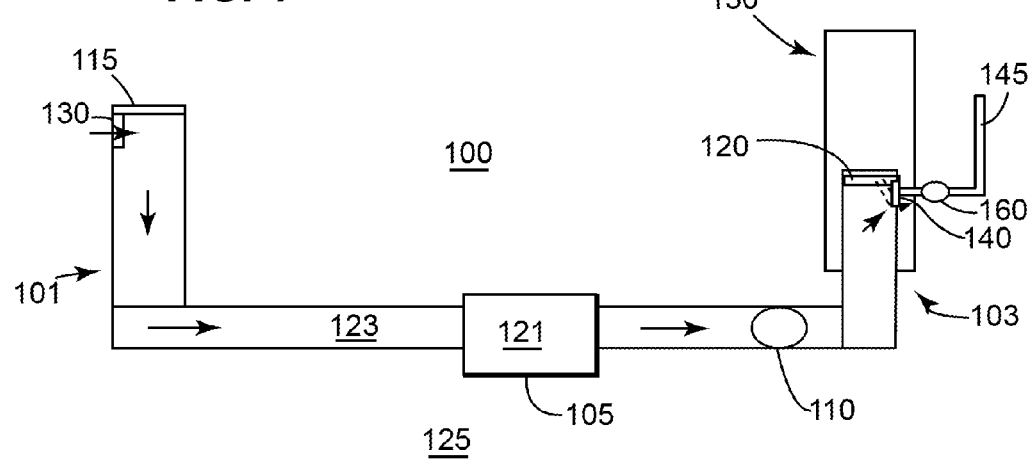
FIG. 1 is a schematic illustrating an example of a system for purging an exhaust stream in accordance with a first embodiment of the present invention.

The following detailed description of preferred embodiments refers to the accompanying drawings, which illustrate specific embodiments of the invention. Other embodiments having different structures and operations do not depart from the scope of the present invention.

Certain terminology may be used herein for the convenience of the reader only and is not to be taken as a limitation on the scope of the invention. For example, words such as "upper," "lower," "left," "right," "front", "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

An EGR system receives a portion of the exhaust (hereinafter "exhaust stream") from a turbomachine, reduces the level of the aforementioned constituents within the exhaust stream, and then recirculates the exhaust stream to an inlet section of the turbomachine. This process facilitates a reduction in level of emissions within the exhaust stream and allows for the removal and sequestration of concentrated $CO_2$.

The exhaust stream in the EGR system should be purged when for example, but not limiting of: a) the EGR system may not be in use; b) the turbomachine has tripped or performed a fired shutdown; c) when an operator seeks to access the components of the EGR for repair, inspection, or maintenance; or d) for any other reason when the exhaust stream should be purged. An embodiment of the present invention has the technical effect of purging the exhaust stream from an EGR system. The exhaust stream existing within the EGR system may need to be purged for a variety reasons, such as, but not limiting of, when an operator may need to access the EGR system components for inspection, repair, service, or the like.

The present invention may be applied to the variety of turbomachines that produce a gaseous fluid, such as, but not limiting of, a heavy-duty gas turbine; an aero-derivative gas turbine; or the like. An embodiment of the present invention may be applied to either a single turbomachine or a plurality of turbomachines. An embodiment of the present invention may be applied to a turbomachine operating in a simple cycle or a combined cycle configuration.

Generally, the EGR purge system of an embodiment of the present invention comprises multiple elements. The configuration and sequence of the elements may be dictated by the configuration of the turbomachine integrated with the EGR system. In general, the EGR purge system displaces the exhaust stream in the EGR loop with a benign fluid, such as, but not limiting of, ambient air. As described below, there are multiple arrangements that may be used to accomplish the purging of the exhaust stream.

The elements of the present invention may be fabricated of any materials that can withstand the operating environment under which the EGR purge system may function and operate. These elements include for example, but not limiting of, a first purge flow modulation device, a second purge flow modulation device, an EGR purge blower, and an EGR purge fan.

Referring now to the Figures, where the various numbers represent like elements throughout the several views, FIG. 1 is a schematic illustrating an example of a system for purging an exhaust stream 121 in accordance with an embodiment of the present invention. FIG. 1 illustrates an EGR system 100, and an EGR purge system 125.

The EGR system 100, as illustrated in FIG. 1, comprises: a first zone 101, a second zone 103, an EGR skid 105, an EGR fan 110, an EGR inlet damper 115, and an EGR exhaust damper 120, that may be integrated with an exhaust section 150 of the turbomachine 147.

The at least one EGR system 100 may be of a size and fabricated of a material capable of withstanding the physical properties of the exhaust stream 121, such as, but not limiting of, a flowrate of about 1000 Lb/hr to about 50000000 Lb/hr and a temperature of about 50 Degrees Fahrenheit to about 1500 Degrees Fahrenheit.

The flow path 123 of the EGR system 100 may be bounded by the inlet section 149 (not illustrated in FIG. 1), and the exhaust section 150. The first zone 101 may be considered the section of the EGR system 100 located near an inlet section 149 of the turbomachine 147. The second zone 103 may be considered the section of the EGR system 100 located near the exhaust section 150 of the turbomachine 147.

The EGR skid 105 generally includes the component (s) of the EGR system 100 that reduces the level of aforementioned constituents from the exhaust stream 121. These component (s) may include at least one heat exchanger, at least one scrubber, at least one demister, or similar components, (none of which are illustrated in the Figures). The EGR fan 110 may circulate the exhaust during the operation of the EGR system 100.

Generally, during the operation of the EGR system 100, the EGR exhaust damper 120 may open to allow for the at least one exhaust stream 121 from the exhaust section 150 of the turbomachine 147 to enter the EGR second zone 103. Then the EGR skid 105 may reduce the level of constituents within the exhaust stream 121. Next, the EGR inlet damper 115 may open to allow for the recirculated exhaust stream 121 to enter the inlet section 149 of the turbomachine 147.

The EGR system 100 should be purged when not in use, such as, but not limiting of, when the turbomachine 147 is not producing exhaust gases. When the EGR system 100 is not use, the inlet and exhaust dampers 115,120, may be shut; the EGR fan 110 may be off; and the EGR skid 105 may not be operating. These conditions may allow for the EGR system 100 to become a contained vessel, or the like, with the exhaust stream 121 inside. Therefore, the exhaust stream 121 should be purged from the EGR system 100.

The benefits of purging the EGR system 100 may include for example, but not limiting of, allowing for inspection, service, or repair of the aforementioned components within the EGR system 100. An EGR purge system 125 may include components that allow for the exhaust to leak out of the EGR system 100, thereby preventing the EGR system 100 from becoming a contained vessel when not in use.

Purging may also be beneficial for preventing corrosion from occurring within the EGR system 100. The exhaust stream 121 that remains within when the EGR system 100 is not in use, may eventually condense, possibly leading to an acid formation and/or liquid formation, within the EGR system 100.

The EGR purge system 125 may also be used when a failure of a component (s) prevents the circulation of the exhaust stream 121 within the EGR system 100. Here, the EGR purge system 125 may remove the exhaust stream 121 from the EGR system 100.

The EGR purge system 125, as illustrated in FIG. 1, comprises: at least one first purge flow modulation device 130, at least one second purge flow modulation device 140, at least one second purge vent 145, and at least one EGR purge fan 110.

The positioning of the EGR purge system 125 components may ensure that the flow path defined by the inlet section 149 and exhaust section 150 of the turbomachine 147, as discussed, is purged. As illustrated in FIG. 1, the at least one first purge flow modulation device 130 may be located within the first zone 101; and the at least one second purge flow modulation device 140 may be located within the second zone 103. The locations of the at least one first purge flow modulation device 130 and the at least one second purge flow modulation device 140 may allow for the purging of the EGR system 100 flow path 123; and also allow for a pressure balance between the first and second zones 101,103.

The at least one first purge flow modulation device 130 and the at least one second purge flow modulation device 140, may be a damper, vent, or other similar device (s). In this first embodiment of the present invention, the at least one first purge flow modulation device 130 may allow for the ambient air (or the like) to enter the EGR system 100. The at least one second purge flow modulation device 140 may allow for the exhaust stream 121 to flow out of the EGR system 100.

The at least one EGR purge fan 110 may draw the exhaust stream 121 through the second purge vent 145. A downstream end of the second purge vent 145 may be open to atmosphere. Alternatively, the downstream end of the second purge vent 145 may be integrated with a system, such as, but not limiting of, a ventilation system that may receive the exhaust being purged from the EGR system 100.

In use, the EGR purge system 125 may function when either the turbomachine 147 is not generating an exhaust that is flowing through the EGR system 100; or when the EGR system 100 in not in operation; or when a component (s) of the EGR system 100 fails; or during any time when an operator of the EGR purge system 125 decides.

Generally, when the EGR system 110 is not operating, the EGR inlet damper 115 and the EGR outlet damper 130 may close, the components of the EGR skid 105 may be de-energized, and the EGR purge fan 160 may also be de-energized.

Under these (or similar) conditions, the EGR purge system 125 may begin operating. The at least one first purge flow modulation device 130 may modulate, allowing for ambient air to enter the flow path 123. Next, the at least one second purge flow modulation device 140 may modulate, allowing for the exhaust stream 121 to flow out of the flow path 123. Next, the EGR fan 110 may energize and created a pressure difference of from about 1 inches of water column to about 30 inches of water column. This allows for a greater portion of the exhaust stream 121 to flow out the flow path 123. Moreover, the at least one first purge flow modulation device 130 allows for the ambient air to replace the exhaust stream 121 within the flow path 123 of the EGR system 100.

Figure 2:
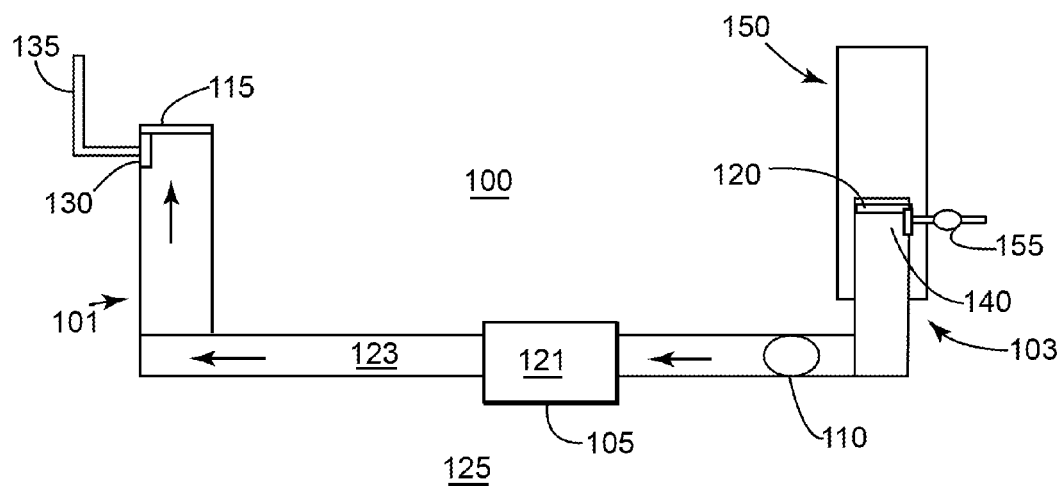
FIG. 2 is a schematic illustrating an example of a system for purging an exhaust stream in accordance with a second embodiment of the present invention.

FIG. 2 is a schematic illustrating an example of a system for purging an exhaust stream 121 in accordance with a second embodiment of the present invention. As illustrated in FIG. 2, the primary difference between this second embodiment and the first embodiment is the manner used for purging the exhaust stream 121 from the EGR system 100. In this second embodiment of the present invention the EGR purge system 125, as illustrated in FIG. 2, comprises: at least one first purge flow modulation device 130, at least one first purge vent 135, at least one second purge flow modulation device 140, and at least one EGR purge blower 155.

The positioning of the EGR purge system 125 components may ensure that the flow path defined by the inlet section 149 and exhaust section 150 of the turbomachine 147 is purged, as discussed. As illustrated in FIG. 2, the at least one first purge flow modulation device 130 may be located within the first zone 101; and the at least one second purge flow modulation device 140 may be located within the second zone 103. The locations of the at least one first purge flow modulation device 130 and the at least one second purge flow modulation device 140 may be advantageous, as described.

The at least one first purge flow modulation device 130 and the at least one second purge flow modulation device 140, may be in the form of a damper, vent, or other device (s), as described. In this second embodiment of the present invention, the at least one first purge flow modulation device 130, may be integrated with the at least one first purge vent 135, allowing for the exhaust stream 121 to be purged out of the EGR system 100. The at least one second purge flow modulation device 140 may allow for a flow stream 121, such as but not limited to, ambient air; to flow into the of the EGR system 100.

In this second embodiment of the present invention, at least one EGR purge blower 155 may be used to drive the exhaust stream 121 through the first purge vent 135. A downstream end of the first purge vent 135 may be open to atmosphere. Alternatively, the downstream end of the first purge vent 135 may be integrated with a system, such as, but not limiting of, a ventilation system that may receive the exhaust being purged from the EGR system 100.

In use, the EGR purge system 125 may begin to function when either the turbomachine 147 is not generating an exhaust stream 121; or when the EGR system 100 in not in operation; or when a component (s) of the EGR system 100 fails; or during any time when an operators of the EGR purge system 125 decides.

As described, when the EGR system 100 is not operating, the EGR inlet damper 115 and the EGR outlet damper 130 may close, the components of the EGR skid 105 may be de-energized, and the EGR fan 110 may also be de-energized.

Under these (or similar) conditions the EGR purge system 125 may begin operating. The at least one first purge flow modulation device 130 may then open, allowing for the exhaust stream 121 to flow through the first purge vent 135. Next, the at least one second purge flow modulation device 140 may then modulate, and the EGR blower purge blower 155 may be energized and created a pressure difference of from about 1 inches of water column to about 30 inches of water column. This allows for a greater portion of the exhaust stream 121 to flow out the EGR system 100 through the first purge vent 135. Moreover, the EGR blower purge blower 155 allows for ambient air to replace the exhaust stream 121 within the flow path 123 of the EGR system 100.

Figure 3:
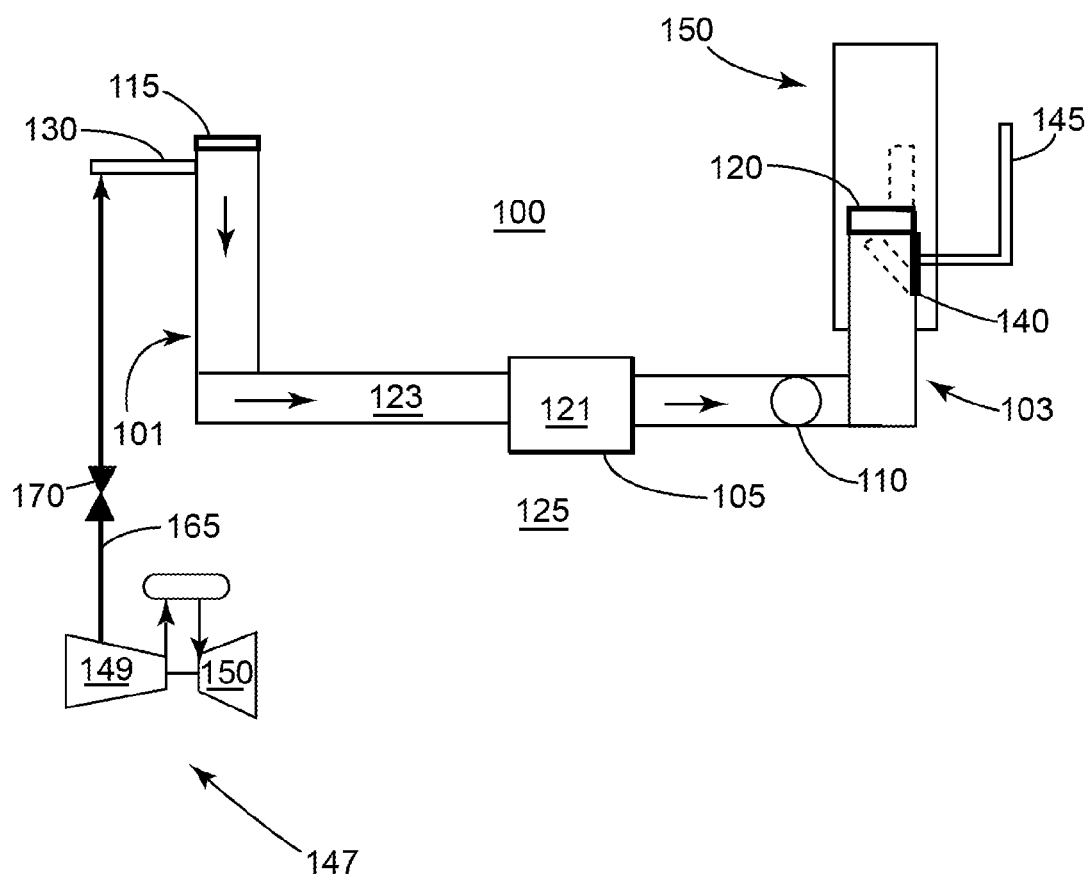
FIG. 3 is a schematic illustrating an example of a system for purging an exhaust stream in accordance with a third embodiment of the present invention.
Figure 4:
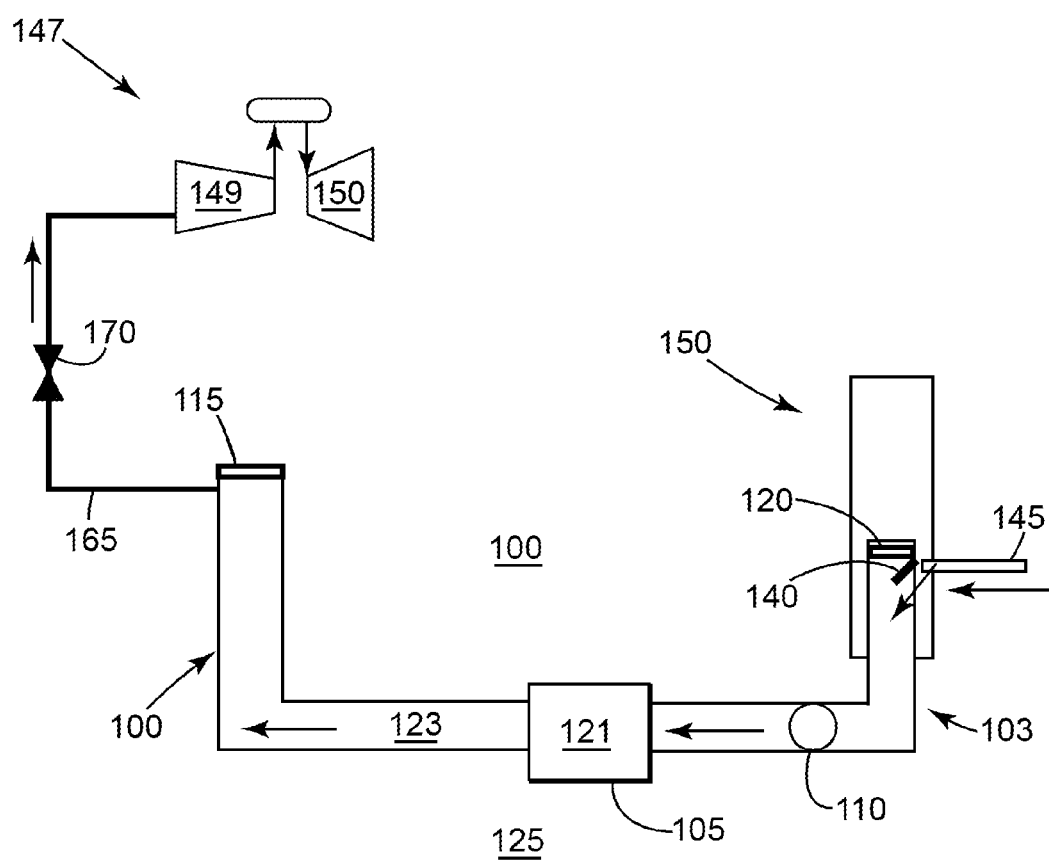
FIG. 4 is a schematic illustrating an example of a system for purging an exhaust stream in accordance with a fourth embodiment of the present invention.

FIGS. 3 and 4 are alternate embodiments of the present invention, illustrating the EGR purge system 125. The primary difference between FIGS. 3 and 4 and FIGS. 1 and 2 is the integration of the turbomachine 147. As discussed below, the EGR purge system 125 may be configured to allow the turbomachine 147 to either draw the exhaust stream 121 into an inlet section 149, or drive the exhaust stream 121 through the second purge vent 145.

FIG. 3 is a schematic illustrating an example of a system for purging an exhaust stream 121 in accordance with a third embodiment of the present invention. As illustrated in FIG. 3, the turbomachine in this third embodiment may include an opening, such as but not limiting to, an extraction, on the inlet section 149. The opening may allow for air to flow from the inlet section, through a purge line 165 having a purge isolation device 170, to the first purge flow modulation device 130.

In use, the EGR purge system 125 may begin to function when either the turbomachine 147 is not generating an exhaust stream 121; or when the EGR system 100 in not in operation; or when a component (s) of the EGR system 100 fails; or during any time when an operators of the EGR purge system 125 decides.

As described, when the EGR system 100 is not operating, the EGR inlet damper 115 and the EGR outlet damper 130 may close, the components of the EGR skid 105 may be de-energized, and the EGR fan 110 may also be de-energized.

Under these or similar conditions the EGR purge system 125 may begin operating. The turbomachine 147 may be operated in any mode allowing for air to flow through the purge line 165. The purge isolation device 170, may be modulated to allow air to flow from the inlet section 149 through the purge line 165 to the at least one first purge flow modulation device 130, which may then modulate, allowing for air to enter the flow path 123. Next, the at least one second purge flow modulation device 140 may modulate, allowing for the exhaust stream 121 to flow out of the second purge vent 145.

Alternatively, an operator may close the second flow modulation device 140, and open the EGR exhaust damper 120. This may allow for the exhaust stream 121 to flow out of the exhaust section 150 of the turbomachine 147.

The at least one first purge flow modulation device 130 allows for air from the inlet section 149 to purge the exhaust stream 121 within the flow path 123 of the EGR system 100.

FIG. 4 is a schematic illustrating an example of a system for purging an exhaust stream 121 in accordance with a fourth embodiment of the present invention. As illustrated in FIG. 4, the turbomachine 147 in this fourth embodiment a portion of the purge line 165 may be integrated with the inlet section 149 of the turbomachine 147. This may allow for the inlet section, which typically includes a compressor, or the like, to draw the exhaust stream 121 out of the EGR system 100.

In use, the EGR purge system 125 may begin to function when either the turbomachine 147 is not generating an exhaust stream 121; or when the EGR system 100 in not in operation; or when a component (s) of the EGR system 100 fails; or during any time when an operators of the EGR purge system 125 decides.

As described, when the EGR system 100 is not operating, the EGR inlet damper 115 and the EGR outlet damper 130 may close, the components of the EGR skid 105 may be de-energized, and the EGR fan 110 may also be de-energized.

Under these or similar conditions the EGR purge system 125 may begin operating. The turbomachine 147 may be operated in any mode allowing for air to flow through the purge line 165. Here, the turbomachine 147 takes in air. The integrating of the purge line 165 with the inlet section 149 may create a vacuum within the purge line 165. The at least one first purge flow modulation device 130 may then open, allowing for the exhaust stream 121 to be drawn into the purge isolation line 165. Next, the at least one second purge flow modulation device 140 allowing for air to be drawn into the EGR system 100, thereby purging the flow path 123 of the exhaust stream 121.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of purging an exhaust stream from an exhaust gas recirculation (EGR) system, wherein the exhaust stream exits a gas turbine; the method comprising:
   providing the gas turbine comprising: an inlet, an external combustion system, and an exhaust section; wherein the gas turbine operatively produces an exhaust stream;
   providing the EGR system comprising: a first zone, a second zone; an EGR skid, an EGR inlet damper, and an EGR outlet damper; wherein the EGR system reduces the level of constituents within the exhaust stream and facilitates the sequestration and removal of concentrated CO2;
   providing an EGR purge system comprising: a first purge flow modulation device located within the first zone, and a second purge flow modulation device located within the second zone;
   operating the EGR purge system operatively with a benign fluid to remove remnants of the exhaust stream remaining in the EGR system when the EGR system is not in operation;
   establishing a pressure balance within the EGR system between the first purge flow modulation device and the second purge flow modulation device as the EGR system operates; and
   establishing a pressure drop between the first zone and the second zone of the EGR system.

2. The method of claim 1, wherein the exhaust stream comprises a flowrate of about 1,000 Lb/hr to about 50,000,000 pounds per hour and a temperature of about 50 Degrees Fahrenheit to about 1500 degrees Fahrenheit; and wherein the gas turbine controls cooperation of the inlet, the external combustion system, and the turbine section, which then collectively determine the magnitudes of the flowrate and the temperature.

3. The method of claim 1, wherein the pressure drop between the first zone and the second zone is from about 1 inches of water column to about 30 inches of water column.

4. The method of claim 1, wherein the EGR purge system further comprises: a first purge vent located within the first zone, and an EGR purge blower located within the second zone; and wherein the EGR purge blower drives the exhaust stream out of the EGR system through the first purge vent.

5. The method of claim 4, wherein the EGR purge system further comprises: a second purge vent located within the second zone, and an EGR purge fan located within the second zone; and wherein the EGR purge fan draws the exhaust stream out of the EGR system.

6. The method of claim 5, wherein the EGR purge system further comprises: a purge line that integrates the EGR purge system with the turbomachine, allowing the turbomachine to drive the exhaust stream out of the EGR system through the second purge vent.

7. The method of claim 4, wherein the EGR blower operatively establishes the pressure drop between the first zone and the second zone in a range of from about 1 inches of water column to about 30 inches of water column.

8. The method of claim 1, wherein the EGR purge system further comprises: a purge line integrates the EGR purge system with the turbomachine, allowing the turbomachine to draw the exhaust stream out of the EGR system.

9. A system of purging an exhaust stream from an exhaust gas recirculation (EGR) system, wherein the exhaust stream is generated by a gas turbine; the system comprising:
   the gas turbine comprising: an inlet, an external combustion system, and an exhaust section; wherein the gas turbine operatively produces an exhaust stream;
   the EGR system comprising: a first zone, a second zone; an EGR skid, an EGR inlet damper, and an EGR outlet damper; wherein the EGR system reduces the level of constituents within the exhaust stream and facilitates the sequestration and removal of concentrated CO2; and
   an EGR purge system comprising: a first purge flow modulation device located within the first zone, and a second purge flow modulation device located within the second zone;
      wherein the EGR purge system operatively uses a benign fluid to remove remnants of the exhaust stream remaining in the EGR system when the EGR system is not in operation;
      wherein the first zone of the first purge flow modulation device and the second zone of the second purge flow modulation device allows a pressure balance within the EGR system as the EGR system operates; and
      wherein the EGR purge system operatively establishes a pressure drop between the first zone and the second zone of the EGR system.

10. The system of claim 9, wherein the exhaust stream comprises a flowrate of about 1,000 pounds per hour to about 50,000,000 pounds per hour and a temperature of about 50 Degrees Fahrenheit to about 1500 degrees Fahrenheit; and wherein the gas turbine controls cooperation of the inlet, the external combustion system, and the turbine section, which then collectively determine the magnitudes of the flowrate and the temperature.

11. The system of claim 9, wherein the pressure drop between the first zone and the second zone is from about 1 inches of water column to about 30 inches of water column.

12. The system of claim 9, wherein the EGR purge system further comprises: a first purge vent located within the first zone, and an EGR purge blower located within the second zone; and wherein the EGR purge blower drives the exhaust stream out of the EGR system through the first purge vent.

13. The system of claim 12, wherein the EGR purge system further comprises: a second purge vent located within the second zone, and an EGR purge fan located within the second zone; and wherein the EGR purge fan draws the exhaust stream out of the EGR system.

14. The system of claim 13, wherein the EGR purge system further comprises: a purge line; that integrates the EGR purge system with the turbomachine, allowing the turbomachine to drive the exhaust stream out of the EGR system through the second purge vent.

15. The system of claim 12, wherein the EGR blower operatively establishes the pressure drop between the first zone and the second zone in a range of from about 1 inches of water column to about 30 inches of water column.

16. The system of claim 9, wherein the EGR purge system further comprises: a purge line that integrates the EGR purge system with the turbomachine, allowing the turbomachine to draw the exhaust stream out of the EGR system.

* * * * *